2,889,366
SUBSTITUTED ALKYL HYDRAZINIUM CHLORIDES

Bernard Rudner, Baltimore, Md., assignor to W. R. Grace & Co., New York, N.Y., a corporation of Connecticut No Drawing. Application April 2, 1956
Serial No. 575,314

7 Claims. (Cl. 260—569)

This invention relates to a class of substituted organic compositions, the structures of which contain a substituded hydrazine, and more particularly to a class of quaternary salts known as hydrazinium chlorides. In one specific aspect, it relates to a new class of chemical compounds, quaternized bis-(hydroxyalkyl)hydrazinium chlorides.

Certain hydrazinium chlorides have been known for many years. Although these compounds have proven utility as catalysts and pharmaceuticals, they are available only in relatively small quantities. Their commercial development has been impeded because their preparation was heretofore dependent on the use of expensive and inaccessible unsymmetrically disubstituted hydrazines. In many cases, the availability of these compounds depended upon long and tedious preparation from hydrazine itself. Other routes to the desired substituted hydrazines presented an equal amount of difficulty. For example, in order to prepare compounds which are generically related to some of those embraced by my invention by initially preparing the substituted hydrazine, it would have been necessary to begin the preparation by reacting a bis(acyloxyalkyl)amine with nitrous acid. Theoretically, this reaction would result in the formation of the nitrosoamine which could be hydrolytically reduced to the 1,1-bis-(hydroxyalkyl)hydrazine. The substituted hydrazine could then be treated with the desired alkyl chloride to form some of the compounds that are within the purview of my invention. However, as a practical matter, this has only rarely been done since there are inherent difficulties in this multi-step reaction. For instance, the reaction of the secondary aminoester with nitrous acid can produce (among other things) organic nitrites which are explosive.

It has been discovered that chloramine will react with tertiary amines to form 1,1,1-trisubstituted hydrazinium chlorides. This reaction presents practically limitless possibilities for the preparation of new and interesting chemical compounds, which, because of their structure and inherent physical properties, exhibit a wide range of uses. Tertiary amines are readily available bases. Chloramine is an excellent reagent since it can be economically obtained in commercial quantities by using the well-known process of Harry H. Sisler et al. described in U.S. Patent No. 2,710,248, where chlorine and ammonia are reacted in the vapor phase to produce chloramine (monochloramine).

The chloramine-tertiary amine reaction works decidedly well under a variety of physical conditions. It may be conducted successfully in anhydrous solution using an excess of the reactant amine as a solvent. An unreactive organic solvent works equally well and even water is an acceptable medium. The term unreactive as applied to solvent is intended to embrace those solvents that do not react preferentially with ammonia, chloramine, or the tertiary amines selected for the reaction under the conditions employed. When the reaction is conducted in anhydrous solution, the desired hydrazinium chloride generally precipitates as the reaction progresses. In aqueous solution, however, it is usually necessary to concentrate or to evaporate to dryness in order to obtain the desired product. If gaseous chloramine is to be used as a reactant, it is necassry to have some base such as excess ammonia present to stabilize the chloramine. Nitrogen may be used as a diluent, although it is not essential in this gaseous mixture.

It is easily seen that the chloramine-tertiary amine reaction provides, for the first time, a direct and commercially acceptable method of obtaining hydrazinium salts. By eliminating the hazardous and unwieldly preparative steps, this reaction has opened vast uncharted regions to the world of chemical exploration. New, useful, and heretofore unknown compounds may now be obtained.

It is therefore an object of my invention to provide new compositions of matter which are properly classified as bis-(hydroxyalkyl)hydrazinium chlorides.

In accordance with the present invention, I have found a novel and useful generic class of hydrazinium chlorides which correspond to the general formula:

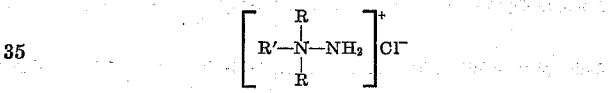

where R and R' are hydroxyalkyl radicals and R" is a member selected from the group consisting of alkyl, substituted alkyl, aryl, aralkyl, and substituted aryl radicals. More specifically, R and R' are hydroxy lower radicals and R" is a member selected from the group consisting of lower alkyl, phenyl lower alkyl, phenyl, lower alkyl phenyl, hydroxy phenyl, and di-lower alkyl amino lower alkyl radicals. In practicing my invention, such tertiary amines as bis-(2-hydroxyethyl)methylamine, bis(2-hydroxyethyl)phenylamine, carboxymethyldiethanolamine, bis(hydroxyethyl)aminopropionitrile, benzyldiethanolamine, stearoylaminomethyldiethanolamine, and many others may be used to prepare some of the particular species of my generic class. In addition, I have found it possible to prepare other tertiary amines (which are not currently available commercially) thereby paving the way for more new and useful compounds. For instance, the tertiary amines containing a cyanoalkyl group are readily prepared. Such amines can be used to prepare compounds corresponding to the general type which I have invented.

In Table I, hereinunder, I have shown specific but non-limiting examples of new compounds included by my invention, along with the preparative amine from which they are derived.

TABLE I

| Amine | Product | Structure |
|---|---|---|
| Methyldiethanolamine | 1,1,1-methylbis(2-hydroxyethyl)hydrazinium chloride. | $\left[\begin{array}{c}CH_3\\(HOCH_2CH_2)_2N-NH_2\end{array}\right]^+ Cl^-$ |
| Ethyldiethanolamine | 1,1,1-ethylbis(2-hydroxyethyl)hydrazinium chloride. | $\left[\begin{array}{c}C_2H_5\\(HOCH_2CH_2)_2NNH_2\end{array}\right]^+ Cl^-$ |
| 2-aminoethyldiethanolamine | 1,1,1-(2-aminoethyl)-bis-(2-hydroxyethyl)hydrazinium chloride. | $\left[\begin{array}{c}(HOCH_2CH_2)_2NNH_2\\CH_2CH_2NH_2\end{array}\right]^+ Cl^-$ |
| Cyanomethyldiethanolamine | 1,1,1-bis(2-hydroxyethyl) cyanomethylhydrazinium chloride. | $\left[\begin{array}{c}(HOC_2H_4)_2N-NH_2\\CH_2CN\end{array}\right]^+ Cl^-$ |
| 3 carbamylpropyldiethanolamine | 1,1,1-(3-carbamylpropyl)-bis(2-hydroxyethyl)hydrazinium chloride. | $\left[\begin{array}{c}(HOC_2H_4)_2NNH_2\\CH_2\\CH_2CH_2CNH_2 \text{ (O)}\end{array}\right]^+ Cl^-$ |
| (2-nitro-2-hydroxymethyl-3-hydroxypropyl)diethanolamine. | 1,1-bis(2-hydroxyethyl)-1-(2'nitro-2'-hydroxymethyl-3'-hydroxypropyl-1')hydrazinium chloride. | $\left[\begin{array}{c}CH_2OH \quad CH_2CH_2OH\\HOCH_2-C-CH_2-N-CH_2CH_2OH\\NO_2 \quad\quad NH_2\end{array}\right]^+ Cl^-$ |
| Stearamidomethyldiethanolamine | 1,1-bis(2-hydroxyethyl)-1-stearamidomethyl-hydrazinium chloride. | $\left[\begin{array}{c}O \quad\quad CH_2CH_2OH\\CH_3(CH_2)_{16}CNHCH_2NNH_2\\CH_2CH_2OH\end{array}\right]^+ Cl^-$ |
| Octadecenylbisdiethanolamine chloride | 1,1-bis(2-hydroxyethyl)-1-octadecenylhydrazinium chloride. | $\left[\begin{array}{c}C_2H_4OH\\C_{18}H_{35}N-C_2H_4OH\\NH_2\end{array}\right]^+ Cl^-$ |
| N-octadecyl-N,N,N'-tris-(hydroxyethyl)propylenediamine. | 1,1-bis (2-hydroxyethyl)-1-N'-(2-hydroxyethyl)-N'-octadecylaminoethyl hydrazinium chloride. | $\left[\begin{array}{c}C_2H_4OH \quad\quad C_2H_4OH\\C_{18}H_{37}NCH_2CH_2CH_2NC_2H_4OH\\NH_2\end{array}\right]^+ Cl^-$ |
| Benzyldi-3-propanolamine | 1-benzyl-1,1-bis(3-hydroxypropyl)-hydrazinium chloride. | $\left[\begin{array}{c}(HOCH_2CH_2CH_2)_2NNH_2\\CH_2C_6H_5\end{array}\right]^+ Cl^-$ |
| 4-hydroxybenzyldiethanolamine | 1,1-bis-(2-hydroxyethyl) 1-(4-hydroxybenzyl)hydrazinium chloride. | $\left[\begin{array}{c}CH_2CH_2OH\\HO-C_6H_4-CH_2-N-CH_2CH_2OH\\NH_2\end{array}\right]^+ Cl^-$ |
| N-2 hydroxypropylephedrine | 1-(2-phenyl-2-hydroxyethyl)-1-(2-hydroxypropyl)-1 methylhydrazinium chloride. | $\left[\begin{array}{c}CH_3\\C_6H_5CHOHCH_2N-NH_2\\CH_3-CHOH-CH_2\end{array}\right]^+ Cl^-$ |
| Phenyldi-2-propanolamine | 1-phenyl-1,1-bis(2-hydroxypropyl)hydrazinium chloride. | $\left[\begin{array}{c}(CH_3CHOHCH_2)_2NNH_2\\C_6H_5\end{array}\right]^+ Cl^-$ |
| 3-nitrophenyldiethanolamine | 1-(3-nitrophenyl)-1,1-bis(2-hydroxyethyl)hydrazinium chloride. | $\left[\begin{array}{c}(HOCH_2CH_2)_2N-NH_2\\C_6H_4-NO_2(p)\end{array}\right]^+ Cl^-$ |
| p-Tolyldiethanolamine | 1-(4-tolyl)-1,1-bis-(2-hydroxyethyl)hydrazinium chloride. | $\left[\begin{array}{c}(HOCH_2CH_2)_2NNH_2\\C_7H_7-p\end{array}\right]^+ Cl^-$ |
| Antipyrylbis(2,3-dihydroxypropyl)amine. | 1-(antipyryl-4-)-1,1-bis-(2,3-dihydroxypropyl)hydrazinium chloride. | $\left[\begin{array}{c}\text{antipyryl}-C-C-N-CH_2CHOHCH_2OH\\CH_2CHOHCH_2OH\\NH_2\end{array}\right]^+ Cl^-$ |
| N,N,N',N'-tetra(β-hydroxyethyl)-1,3-propylenediamine. | 1,3-propylenebis(di-β-hydroxyethyl)hydrazinium chloride. | $\left[\begin{array}{c}(HOC_2H_4)_2N-C_3H_6N(C_2H_4OH)_2\\NH_2 \quad\quad NH_2\end{array}\right]^+ 2Cl^-$ |

My invention is further illustrated by the following examples:

Example I

A generator was constructed to produce a chloramin-ammonia mixture using the aforementioned process of Sisles et al. Such a gaseous chloramine-ammonia mixture was bubbled into 20 ml. of methyldiethanolamine, in 50 ml. of xylene for 77 minutes. The reaction was strongly exothermic. Although the mixture was cooled in a water bath, its temperature remained at 40–43° C. during the gassing operation. I allowed it to stand overnight without further treatment, during which time chloramine was completely consumed. A clear upper layer of xylene was decanted from the opaque oily product. I subsequently washed the product by decantation with three successive 25 ml. portions of xylene. The tan oily liquid, crude 1-methyl-1,1-bis-(2-hydroxyethyl)hydrazinium chloride, could not be obtained in solid form by freezing, trituration with solvents (e.g. hexane, ether, and dioxane), or precipitation from solvents. After purification of my product by charcoaling in alcohol solution, evaporating the solvent, and vacuum drying over $P_2O_5$, I obtained a viscous odorless brown oil. This oil was soluble in water, alcohol, and to a limited extent acetone; it was insoluble in less polar solvents. My attempts to prepare less soluble, solid characterizable salts such as the hexafluophosphate or picrate, were unsuccessful. However, my product did form a diliturate (subliming at 120° C.) from aqueous solution. In addition, it formed a gummy benzoyl derivative, by use of the standard Schotten-Baumann procedure. By recrystallization from 2-propanol, I obtained white plates of 1-methyl-1,1-bis(2-benzoyloxyethyl)hydrazinium benzoate, melting at 163–165° C.

I found that dimethylformamide could be advantageously used in lieu of xylene as a reaction medium since the reaction was quicker and the starting base more soluble in the amide.

*Example II*

I repeated the procedure described hereabove using ethyldiethanolamine as a reactant. The resuts in all aspects were strikingly similar. I obtained as a product, in slightly reduced yield, a brown oil possessing comparable physical properties. Its dibenzoate melted at 191.5–193° (dec.), and formed a picrate melting above 200° C.

*Example III*

A chloramine-ammonia gas stream (obtained as described in Example I) was passed into a solution of 20.3 g. of phenyldiethanolamine in 50 ml. of dimethylformamide for 55 minutes. The reaction temperature was maintained at 40–42° C. by using a cold water bath. I allowed the reaction mixture to stand without further treatment overnight. When I subsequently filtered it, I obtained 11.2 g. (air-dried) of pale blue crude 1-phenyl-1,1-bis-(2-hydroxyethyl)hydrazinium chloride. My product sublimed at 206–210° C. Evaporation of the filtrate gave (after workup) an additional 4.1 g. of crude hydrazinium chloride. After purification by recrystallization from 2-propanol, the sublimation point of my novel pale blue crystals remained unchanged. I found my product to be soluble in water and alcohol, and insoluble in hydrocarbons, ethers, and halohydrocarbons. Aqueous solutions of my new compound are strong reductants only when alkaline. My attempts to form a relatively insoluble hexafluophosphate, iodide, or mercuriiodide were unsuccessful. I did make a diliturate that appeared as fine white crystals from water. This product melted above 250° C., with inchoate sublimation at about 223° C.

*Example IV*

A solution of 20 g. of 2,2'-(p-hydroxyphenylimino)diethanol (sometimes also referred to as p-hydroxyphenyldiethanolamine) in equal volumes of dioxane and dimethylformamide was treated with an excess of ammonia to convert it to solvent-soluble ammonium salt, then subjected to the chloramine treatment described in earlier examples. The temperature of the red-brown solution rose to 50° C. in about 10 minutes. A cold water bath was used to control the reaction temperature at 35° C. The color of the solution faded, and a crystalline solid formed. Shortly after gasification had been discontinued (chloramine treatment lasted 40 minutes), the reddish supernatant had lost its power to oxidize acidified potassium iodide solution (i.e., no longer contained chloramine). It was filtered, and the yellowish solid, crude 1,1 - bis(2-hydroxyethyl)-1-p-hydroxyphenylhydrazinium chloride,

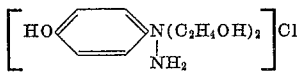

was obtained as a product. It was washed with two 30 ml. portions of dioxane, then with two 30 ml. portions of hexane. The washed product was air dried overnight, then vacuum dried for two hours, yielding 10 g. of a mixture (most of which melted below 150° C.) of roughly five parts product to one part ammonium chloride. Recrystallization converted this to an off-white, sandy solid, M.P. 156–7° C.

The red filtrate and combined washings was partially evaporated, then treated with ether to form 9 g. of dark, heavy gum, and 2 g. of crystalline, tan solid. By fractional solubility in chloroform, 2-propanol, and hexane, these two fractions were shown to contain some unchanged parent amine, approximately 3 g. of the aforementioned hydrazinium chloride, and an appreciable quantity of a novel compound; 1,1-bis-(2-hydroxyethyl)-1-(p-oxyphenyl)hydrazinium betaine.

*Example V*

A solution of 0.01 mol of chloramine (0.51 g.) in 50 ml. of xylene was treated with 5 ml. of α-methylbenzyldiethanolamine at 10–15° C., and allowed to sit overnight. The xylene was then decanted, and the sticky, insoluble product was dissolved in acetone, filtered free of ammonium chloride, and evaporated to dryness. The viscous oil left after evaporation was washed well with anhydrous ether, which converted it to gleaming prisms of 1,1-bis-(2-hydroxyethyl)-1-(1-phenylethyl)hydrazinium chloride, M.P. 100–105° C. The crude product, on recrystallization, melted at 108–110° C. It was very soluble in water, soluble in alcohol and somewhat less so in acetone, but insoluble in less polar organic solvents. It failed to form an insoluble hexafluorophosphate or iodide.

The above reaction was repeated with a change of technique: a chloramine-ammonia gas stream was passed directly into the liquid amine for 61 minutes. Since exothermic reaction produced no second phase, the reaction mixture was allowed to stand overnight. Addition of a large volume of ether to the homogenous brown solution gave, in good yield, a viscous brown oil as a crude product. Repeated purification procedures, e.g. decolorizing aqueous solutions with charcoal, precipitating from acetone solution by ether etc., failed to convert the product to a solid. However, seeding the pale yellow oil with a crystal from the first preparation gave a tan solid, M.P. 102–105° C. By its reactions and adsorption spectra, it was shown to be 1,1-bis(2-hydroxyethyl)-1-(1-phenylethyl-1)hydrazinium chloride, contaminated by small amounts of oxidation products, but otherwise identical with the solid from the first experiment.

*Example VI*

Diethanolamine, warmed with an aqueous mixture containing one equivalent of hydroxymethyldibutylamine, gave a fair yield of N,N-dibutyl-N',N'-bis(hydroxyethyl)-diaminomethane, according to the preparative reaction:

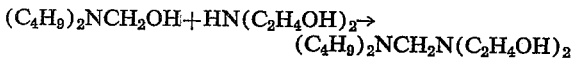

The slightly yellow aqueous solution was saturated with anhydrous potassium carbonate, giving an upper layer of a viscous, light yellow oil. The crude diamine was dissolved in ether, dried over anhydrous potassium carbonate, and then treated with an ethereal solution of chloramine (2 equivalents, or 0.12 g. by active chlorine determination). The mixture was kept in a cold water bath overnight, by which time an oil, containing some solid, had settled out. The solvent was decanted off, the heavy yellowish oil dissolved in excess acetone, and the solution filtered free of solid. The acetone solution, on evaporation in the absence of excess moisture, gave a brownish-yellow oil, crude 1,1-bis(2-hydroxyethyl)-1-(di - n - butylamino)methylhydrazinium chloride. The product was very soluble in (and readily decomposed by) water; it was soluble in alcohol, less so in acetone, and insoluble in ether and hydrocarbons. Attempts to convert the oil to a solid, or to solid derivatives, failed, possibly because of competing solvolysis. In water (especially hot water), acidic or alkaline solutions, it is readily hydrolyzed to a dark, oily polymer; water-insoluble, basic, and malodorous. Formaldehyde is an intermediate in this reaction: hydrolysis in the presence of excess 2,4-dinitrophenylhydrazine as a solution in 2NHCl gave formaldehyde, 2,4-dinitrophenylhydrazone, dibutylamine hydrochloride, and hydrochlorides of other water-soluble bases, but no polymer.

My new and novel class of compounds has pronounced utility both as such and as intermediates for other useful products. The 1,1-bis(hydroxyalkyl)1-aryl- and -1-aralkylhydrazinium salts are valuable pharmaceuticals, showing marked neutral effects. All of the compounds studied are marked anti-oxidants, especially in alkaline media, and some, e.g. the oxyphenylbetaine, are strong reducing agents useful in photographic work. Possibly because of this anti-oxidant property, my compounds are of value as corrosion-inhibitors, e.g. in magnesium or steel working. This is especially true of the phosphates and fluorides of the higher molecular weight compounds of this class, e.g. the stearamidoethylbis(hydroxyethyl)hydrazinium phosphate. Addition of this, or similar compounds to a pickling bath prevents corrosion of iron.

These compounds exhibit a more versatile utility as intermediates. Esters of certain compounds have demonstrable physiological effects that mark them as potentially valuable medicinals. Thus the mono-diphenylacetate of 1-ethyl-1,1-bis-(2-hydroxyethyl)hydrazinium chloride is an anti-spasmodic, and the N-methylcarbamate of 1,1-bis-(2-hydroxyethyl)-1-(4-hydroxyphenyl) hydrazinium chloride exhibits anti-cholinestearase activity.

The use of the compounds in polymer formation has already been mentioned. Use of a dibasic acylating agent, e.g. adipic acid or 4,4'-diisocyanatobiphenyl, gave polymers capable of being oriented into fibers. Use of the triisocyanate mentioned in Example VI gave, even with bis-hydroxyethylhydrazinium compounds, low molecular weight polymers heat-transformable only to infusible solids. Other types of polymers have been prepared from various members of my novel class. Thus esterification of 1-methyl-1,1-bis(2-hydroxyethyl) hydrazinium chloride with acrylic anhydride gave a bis-acrylate that was heat-polymerizable to an infusible polymer. Phenol-formaldehyde polymers were obtained on heating an acidic formalin solution of hydroxyphenyl-bis-(2-hydroxyethyl)hydrazinium chloride. All of these polymers were, obviously, polyelectrolytes capable of undergoing ion exchange reactions.

By metathesis, the hydrazinium chlorides have been converted to other useful salts. I have, for example, prepared crystalline salts of several pharmaceuticals, including aspirin and sulfathiazole, with some of the higher molecular weight hydrazinium compounds. Some of the hydrazinium salts, such as 1,1-bis-(2-hydroxyethyl)-1-phenylhydrazinium chloride and 1,1-bis(4-hydroxybutyl)-1-benzylhydrazinium chloride, form water-insoluble salts with certain acidic dyestuffs, e.g. Neptune Blue, Congo Red, etc. These brightly colored products are (dependent on the structure of both the hydrazinium chloride and the dye) solvent-soluble or solvent insoluble, and are therefore useful as lacquer dyes or pigments. The lower molecular weight chlorides, e.g. tris-(2-hydroxyethyl)hydrazinium chloride, form generally water-soluble dyes with the same coloring matters.

I claim:

1. As a new chemical compound, 1-ethyl-1,1-bis-(2-hydroxyethyl)hydrazinium chloride.

2. As a new chemical compound, 1-phenyl-1,1-bis-(2-hydroxyethyl)hydrazinium chloride.

3. As a new chemical compound, 1,1-bis-(2-hydroxyethyl)-1-p-hydroxyphenylhydrazinium chloride.

4. As a new chemical compound, 1,1-bis-(2-hydroxyethyl)-1-(phenylethyl)hydrazinium chloride.

5. New chemical compounds having the general formula:

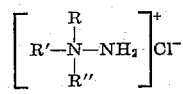

wherein R and R' are hydroxy lower alkyl radicals and R'' is a member selected from the group consisting of lower alkyl, phenyl, phenyl lower alkyl, lower alkyl phenyl and hydroxy phenyl radicals.

6. Compounds according to claim 5 wherein R'' is lower alkyl.

7. Compounds according to claim 5 wherein R'' is phenyl lower alkyl.

References Cited in the file of this patent

Westphal: Ber. 74:759–776; Ber. 74:1365–1372 (1941).